(12) United States Patent
Croxford

(10) Patent No.: US 10,917,655 B2
(45) Date of Patent: Feb. 9, 2021

(54) VIDEO DATA PROCESSING USING AN IMAGE SIGNATURES ALGORITHM TO REDUCE DATA FOR VISUALLY SIMILAR REGIONS

(71) Applicant: Apical Limited, Cambridge (GB)

(72) Inventor: Daren Croxford, Swaffham Prior (GB)

(73) Assignee: Apical Limited, Cambridge (GB)

( * ) Notice: Subject to any disclaimer, the term of this patent is extended or adjusted under 35 U.S.C. 154(b) by 204 days.

(21) Appl. No.: 16/212,478

(22) Filed: Dec. 6, 2018

(65) Prior Publication Data

US 2020/0186816 A1 Jun. 11, 2020

(51) Int. Cl.
*H04N 19/467* (2014.01)
*H04N 19/80* (2014.01)
*H04N 19/172* (2014.01)
*H04N 19/543* (2014.01)

(52) U.S. Cl.
CPC ......... *H04N 19/467* (2014.11); *H04N 19/172* (2014.11); *H04N 19/543* (2014.11); *H04N 19/80* (2014.11)

(58) Field of Classification Search
CPC .... H04N 19/467; H04N 19/80; H04N 19/172; H04N 19/543
USPC .................................................. 375/240.08
See application file for complete search history.

(56) References Cited

U.S. PATENT DOCUMENTS

| 5,136,378 A * | 8/1992 | Tsurube | H04N 19/503 348/415.1 |
| 2005/0268341 A1* | 12/2005 | Ross | G06F 21/64 726/26 |
| 2013/0268621 A1* | 10/2013 | Mese | H04N 19/17 709/217 |
| 2014/0152891 A1* | 6/2014 | Gilbert | G06K 9/00744 348/441 |
| 2014/0218378 A1* | 8/2014 | Roh | G09G 5/393 345/519 |

* cited by examiner

*Primary Examiner* — Marnie A Matt
(74) *Attorney, Agent, or Firm* — EIP US LLP

(57) ABSTRACT

A method for processing video data, comprising: receiving a stream of input video data representative of a number of successive frames generated by an imaging device's image sensor; selecting at least some of the frames; for each selected frame: determining, using an image signature algorithm, a signature for each region of the given selected frame; and, based on such signatures, classifying each region in that frame as either a changing or a static region; and generating an output video data stream that is a compressed version of the input video data, with a greater average data reduction rate for static region data than for changing region data, of the selected frames. The signature algorithm is such that a region's signature has substantially smaller size than the input data representative of that region, and such that signatures for visually similar regions are the same or similar.

20 Claims, 7 Drawing Sheets

VIDEO DATA PROCESSING USING AN IMAGE SIGNATURES ALGORITHM TO REDUCE DATA FOR VISUALLY SIMILAR REGIONS

BACKGROUND OF THE INVENTION

Technical Field

The present invention relates to methods and apparatus for processing video data representative of a video.

Processing video data may be computationally intensive and consequently may be energy intensive, generating considerable amounts of heat and, in battery-powered devices, quickly exhausting battery life. It is desirable to reduce the processing demands of such methods.

SUMMARY

According to an aspect of the present disclosure, there is provided a method for processing video data can comprise: receiving a stream of input video data representative of a plurality of successive frames, which have been generated by an image sensor of an imaging device; selecting at least some of said plurality of successive frames; for a given one of said selected frames: determining, using an image signature algorithm, a signature for each of a plurality of regions of the given selected frame; and based, at least in part, on the signatures for the regions of the given frame, classifying each region as either a changing region or a static region; and generating a stream of output video data that is a compressed version of said stream of input video data, in which an average data reduction rate for data representing the static regions of the selected frames is greater than an average data reduction rate for data representing the changing regions of said selected frames; wherein the signature algorithm is such that a signature of a given region has substantially smaller size than a portion of the input video data stream representative of said given region, and is characteristic of the given region, such that signatures for visually similar regions are the same or similar.

According to another aspect of the present disclosure, there is provided a video processing system comprising: an imaging device, which comprises an image sensor; at least one processor; and storage accessible by the at least one processor, having stored thereon instructions which, when executed by the at least one processor, cause the at least one processor to: receive a stream of input video data representative of a plurality of successive frames, which have been generated by said image sensor; select at least some of said plurality of successive frames; for a given one of said selected frames: determine, using an image signature algorithm, a signature for each of a plurality of regions of the given selected frame; and based, at least in part, on the signatures for the regions of the given frame, classify each region as either a changing region or a static region; and generate a stream of output video data that is a compressed version of said stream of input video data, in which an average data reduction rate for data representing the static regions of the selected frames is greater than an average data reduction rate for data representing the changing regions of said selected frames; wherein the signature algorithm is such that a signature of a given region has substantially smaller size than a portion of the input video data stream representative of said given region, and is characteristic of the given region, such that signatures for visually similar regions are the same or similar.

According to another aspect of the present disclosure, there is provided a non-transitory, computer-readable storage medium comprising a set of computer-readable instructions which, when executed by at least one processor, cause the at least one processor to: receive a stream of input video data representative of a plurality of successive frames, which have been generated by an image sensor of an imaging device; select at least some of said plurality of successive frames; for a given one of said selected frames: determine, using an image signature algorithm, a signature for each of a plurality of regions of the given selected frame; and based, at least in part, on the signatures for the regions of the given frame, classify each region as either a changing region or a static region; and generate a stream of output video data that is a compressed version of said stream of input video data, in which an average data reduction rate for data representing the static regions of the selected frames is greater than an average data reduction rate for data representing the changing regions of said selected frames; wherein the signature algorithm is such that a signature of a given region has substantially smaller size than a portion of the input video data stream representative of said given region, and is characteristic of the given region, such that signatures for visually similar regions are the same or similar.

BRIEF DESCRIPTION OF THE DRAWINGS

Further features will become apparent from the following description, given by way of example only, which is made with reference to the accompanying drawings, in which.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Portions of a video may remain relatively unchanged from frame to frame. As an illustrative example, if the video has been obtained from a security camera at a fixed position, the portion of the video corresponding to a background of a scene, which may stay the same over time, may also remain the same over a series of frames.

Processing a video typically requires a significant amount of computation and may consequently be energy intensive. Furthermore, transferring a stream of video data may be energy intensive, especially with high frequency and/or high definition video. Video compression may be used to reduce the amount of data transferred; however, many video compression methods are themselves computationally intensive, resulting in additional heat generation and/or burdening scarce processing resources.

Methods described in accordance with embodiments of this disclosure classify regions of video frames as changing or static regions, based, at least in part, on signatures for regions of the video frames, and use this classification to generate a compressed output video stream in which an average data reduction rate for data representing static regions is greater than an average data reduction rate for data representing changing regions. Such methods may remove redundant video data and therefore reduce the amount of data being transferred or processed downstream, in a manner that is computationally lightweight. Accordingly, such methods may, in some cases, generate a relatively minor amount of heat overall (e.g. when processing and transmission are both considered) and/or may require a relatively small amount of memory and/or processing resources.

Figure 1:
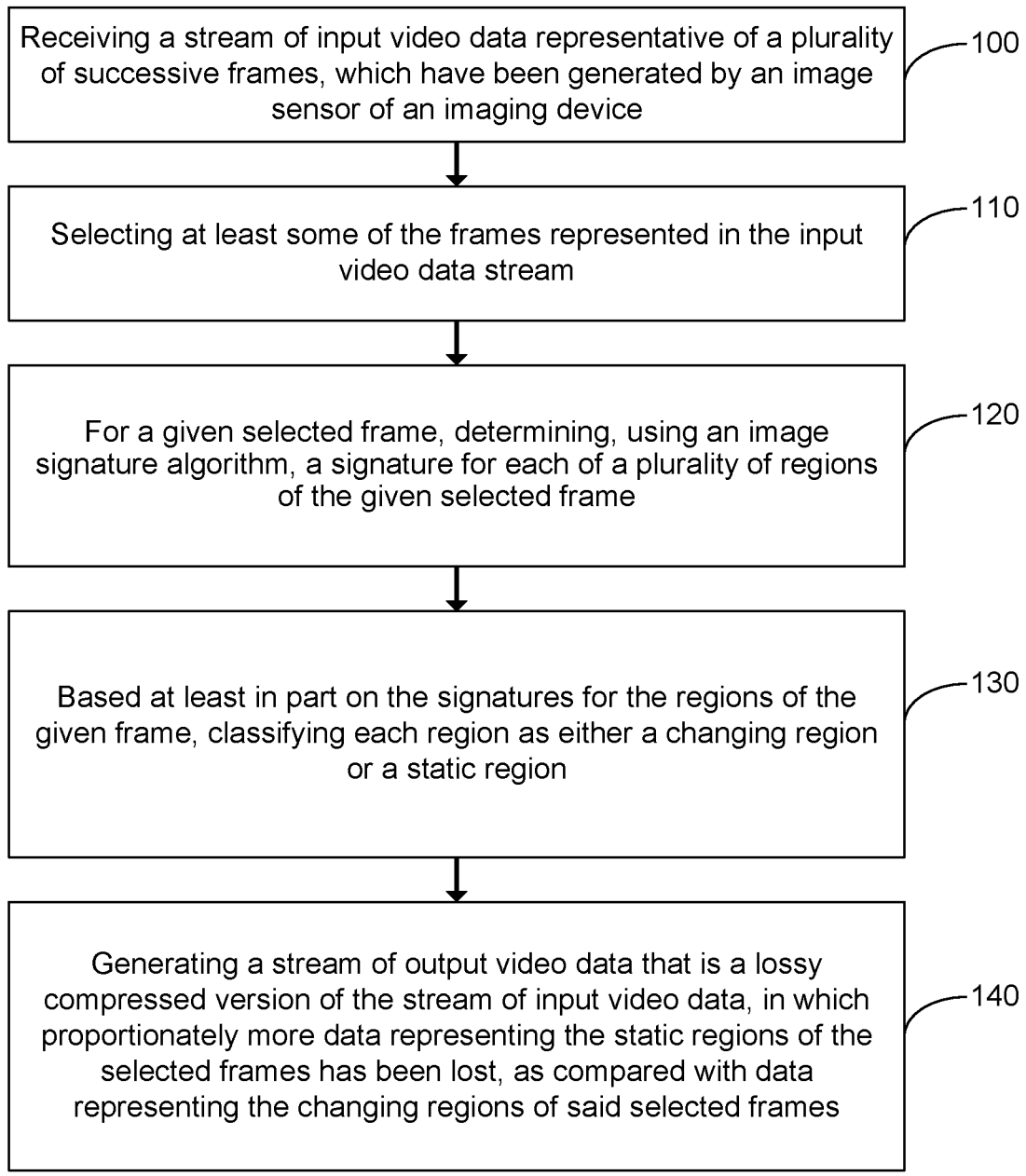
FIG. 1 is a flow diagram showing a method of processing video data according to a first embodiment of the disclosure.

Referring now to the Figures, attention is firstly directed to FIG. 1, which is a flow diagram showing a method of processing video data according to a first embodiment of the disclosure. The method of FIG. 1 may be implemented using a video processing system, such as the system illustrated schematically in FIG. 6 and described below.

As shown, the method includes a step 100 of receiving a stream of input video data representative of a plurality of successive frames, which have been generated by an image sensor of an imaging device.

A frame for example corresponds to a still image. A series or sequence of frames, which typically represent a series of sequential images, can be considered to correspond to a video or a moving picture. A frame generally includes a plurality of pixels, for example disposed in a rectangular array.

The frames may be represented in the input video data stream in any suitable format, such as a raw image format.

The imaging device may, for example, be a camera, it being understood that the term "camera" does not imply a limitation to visible light: an imaging device configured to detect other wavelengths (e.g. by employing a suitable image sensor), such as infra-red, ultraviolet, X-rays etc. might equally be referred to as a "camera". More broadly, it is envisaged that the imaging device need not be configured such that each frame represents an intensity pattern for electromagnetic radiation; rather, the imaging device might be configured such that each frame represents, for example, depth/distance from the device.

As discussed in more detail below with reference to FIG. 6, an image sensor typically includes an array of sensor pixels, which may be any suitable sensors for capturing images, such as photosensors.

As also shown in FIG. 1, the method further includes a step 110 of selecting at least some of the frames represented in the input video data stream. These selected frames are processed further in steps 120 and 130. In some embodiments, such as those described below with reference to FIGS. 4A and 4B, substantially all of the frames represented in the input video data stream may be selected. However, this is by no means essential and, in other embodiments, only certain of the frames may be selected; for instance, where few or no changes are identified between successive frames, the method may skip over one or more frames represented in the input video data stream.

FIG. 1 further shows method step 120, which is carried out for each frame selected in step 110. For a given selected frame, the method determines, using an image signature algorithm, a signature for each of a plurality of regions of the given selected frame.

A region of a frame is typically made up of a plurality of pixels and may for example be a block or tile of a frame, for instance having rectangular shape. The plurality of regions of a frame may have a tessellating arrangement that completely covers the frame; for instance, the regions may be arranged in a rectangular array (and may also themselves be rectangular).

Furthermore, in some embodiments there may be a hierarchy of regions. For example, there might be a series of sets of regions, with each region in a given set corresponding to a subset of two or more of the regions of the next set in the series (for instance with subsets for different regions being disjoint). The regions of each set within such a series may, for example, completely cover the frame. In some cases, therefore, the number of regions in a given set will be greater than the previous set and less than the next step in the series.

A method using a hierarchy of regions might, for example, determine the signatures for each set in the series, in order. This might for instance enable the method to determine relatively early on whether a large region of the frame (one belonging to an earlier set in the series) is static. The method might then choose not to determine signatures for any of the smaller regions in later sets that correspond to that larger, static region. In some cases, this may efficiently determine which parts of the frame are changing and which are static.

In the examples described herein, the signature algorithm is such that a signature it produces for a region is characteristic of that region. Accordingly, signatures produced by the signature algorithm in respect of visually similar regions will be the same or similar. The signature algorithm is further characterized in that a signature produced for a given region is substantially smaller than the portion of the input video data stream representative of that region. A signature produced by the signature algorithm may, for example, be described as data which is representative of, or summarizes the content of a region.

In some embodiments, the signature algorithm may be a hashing algorithm, such as an image hashing algorithm (also known as a perceptual hashing algorithm), or, more generally, may comprise a hashing function as one of a number of steps for the signature algorithm.

A hashing algorithm is for example a one-way algorithm in which an output (referred to as a hash) is deterministic, such that repeating the application of the hashing algorithm to exactly the same input data will produce the same hash. The resulting hash may be of a fixed length, which may be relatively small, and smaller than data representative of the frame region itself. Examples of hashing functions include cyclic redundancy check functions, checksum functions and Fowler-Noll-Vo functions.

The signature algorithm may act on, or be applied to, only part of the data representative of a region. For instance, it might act only on one color channel, such as a luminance channel (e.g. the Y channel in a YUV color space), since the eye is more sensitive to changes in brightness than color, or it might only act on the most significant bits of the region data. As a specific example, the signature algorithm might apply a hashing function (e.g. a cyclic redundancy check function, a checksum function or a Fowler-Noll-Vo function), to the most significant bits of the region data.

In some embodiments, the data corresponding to each frame represented within the input video data stream may not be saved to a memory (such as a framebuffer); rather, only signature data may be written to memory, with the data corresponding to each frame represented within the input video data stream being processed as it is received.

Referring again to FIG. 1, the method further includes step 130, which is likewise carried out for each frame selected in step 110. In step 130, the method classifies each region of a given frame as either a changing region or a static region. A changing region is for example a region that is calculated to be changing significantly with respect to time. Conversely, a static region is for example a region that is calculated to not be changing significantly—to be remaining static—with respect to time.

This classification is based, at least in part, on the signatures for the regions of the given selected frame, which were calculated in step 120. Because such signatures are substantially smaller in size than the portions of the input video data stream they are generated from, the classification may require a relatively small amount of memory (e.g. because less data needs to be buffered) and/or processing resources (e.g. because only a small amount of data is processed).

As noted above, step 120 involves classifying regions based, at least in part, on the signatures for the regions of the given selected frame; it should therefore be appreciated that the classification may, in some embodiments, be based in part on additional data.

For example, in some embodiments, such as those described below with reference to FIGS. 2A-2C, the classification may be partly based on a plurality of comparison signatures for the given frame, which have been generated by the same signature algorithm as the signatures for the regions of the given frame. These comparison signatures may include a respective signature for each of a plurality of regions of a comparison frame for the given frame, for example the frame immediately preceding the given frame within the input video data stream. In a more complex example, the comparison signatures might include respective signatures for the regions of a group of comparison frames, such as the two, three or four frames preceding the given frame.

In some embodiments, the comparison signatures for a given frame may have been calculated previously and stored in memory (e.g. in a buffer). In such embodiments, in order that the comparison signatures may be compared with the signatures for the regions of the given frame that are determined in step 120, the method may involve recalling the comparison signatures from memory. Furthermore, the method of FIG. 1 may include, as an optional step subsequent to step 120, storing the signatures that have just been determined for the regions of the given selected frame (e.g. in a buffer); these signatures may then be recalled so as to serve as comparison signatures for a later frame. It is of course not essential that the comparison signatures are stored in and recalled from memory: in other embodiments they might simply be determined as needed. Moreover, even in embodiments where comparison signatures are, in general, recalled from memory, there may be occasions when it is necessary to determine such comparison signatures on demand (for example where no signatures were previously determined for the comparison frame because it was not selected in step 110).

It should however be understood that such comparison signatures are not essential, since classification of the regions of a given frame may be carried out using just the region signatures for the given frame, for example using the method described below with reference to FIGS. 3A and 3B.

In further embodiments, the classification of the regions of a given frame may be based in part on imaging device motion data, in addition to being based on the on the signatures for the regions of the given selected frame (and, optionally, other additional data, such as the comparison signatures described above). Such imaging device motion data may assist in determining which regions are likely to be changing regions, as will be discussed in more detail below. Imaging device motion data is for example data that is representative of motion by the imaging device; for instance, it might be representative of translations and/or rotations of the imaging device. Such data may, for example, be generated by suitable motion sensors, such as accelerometers, gyro sensors, magnetometers, etc. Alternatively, motion data could be generated by analysis of portions of consecutive frames; for example, if several portions with the same relative locations within two frames all have strongly correlated image data, all with the same spatial offset, this may be taken as an indication of movement by the imagine device.

Referring once more to FIG. 1, the method further includes step 140, of generating a stream of output video data that is a compressed version of the stream of input video data, in which an average data reduction rate for data representing the static regions of the selected frames is greater than an average data reduction rate for data representing the changing regions of said selected frames. Thus, the identification in step 130 of changing regions and/or static regions within the selected frames assists in the generation in step 140 of a stream of output video data that consumes relatively little bandwidth.

In some embodiments, generating the output video data stream may comprise discarding data from the input video data stream that represents at least some of the static regions of the selected frames in the input video data stream. For example, data representing frames where the total magnitude of changing regions is less than a threshold value may be discarded (as is the case in particular embodiments described below with reference to FIGS. 5A and 5B). In another example, data representing individual static regions might be discarded, for instance with the output video data stream representing only changing regions (as is the case in particular embodiments described below with reference to FIGS. 4A and 4B). Indeed, in such cases, substantially all data representative of static regions might be discarded.

In embodiments where data representative of some or all of the static regions is discarded, the output video data stream may include data that indicates those dropped static regions (the static regions whose representative data has been discarded). This data may be used by other processes, for example processes downstream in an imaging pipeline. For instance, downstream processes may use such dropped region data to recall from memory (e.g. from a frame-buffer)

data representative of a corresponding region of a previous frame. This may, in some cases, assist with the reconstruction of an input frame at a high fidelity level, and in some cases may allow exact reconstruction (e.g. where data in the output stream representative of the changing regions is not compressed). Additionally, or alternatively, dropped region data may be used to assist with various downstream image processing operations, such as bayer processing, demosaicing and/or temporal noise filtering, and/or to assist with various computer vision processes, such as object detection.

Nonetheless, such discarding of static region data is by no means essential and, in other embodiments, generating the output video data stream might comprise compressing portions of the input video data stream representative of static regions more heavily as compared with portions representative of changing regions. In one example, different compression algorithms could be used for the changing regions and the static regions respectively, e.g. one with a higher loss rate for the static regions than the changing regions; indeed, the changing regions could in some cases be losslessly compressed, or not compressed at all, relative to the corresponding data in the input video data stream. In some cases, the different algorithms may be of generally the same type, but use different parameters, e.g. corresponding to the amount of data loss.

Furthermore, different compression algorithms could be used for, respectively, frames where the total magnitude of changing regions is less than a threshold value (i.e. mostly static frames), and frames where the total magnitude of changing regions is greater than the threshold value (i.e. mostly changing frames). It will nonetheless be understood that in such cases—when the output video data stream is considered as a whole—the average data reduction rate for data representing the static regions of the selected frames is greater than the average data reduction rate for data representing the changing regions of said selected frames.

The method described with reference to FIG. 1, at least partly as a consequence of generating a compressed output video stream in which an average data reduction rate for data representing the static regions of the selected frames is greater than an average data reduction rate for data representing changing regions, may reduce the amount of data that is transferred or that is processed downstream. Furthermore, at least partly because the static and changing regions are classified based, at least in part, on signatures for regions of each of the selected frames, with such signatures being substantially smaller in size than the portions of the input video data stream they are generated from, the method described with reference to FIG. 1 may be computationally lightweight. Accordingly, such methods may, in some cases, generate a relatively minor amount of heat overall (e.g. when both processing and transmission are considered) and/or may require a relatively small amount of memory and/or processing resources.

Figure 2A:
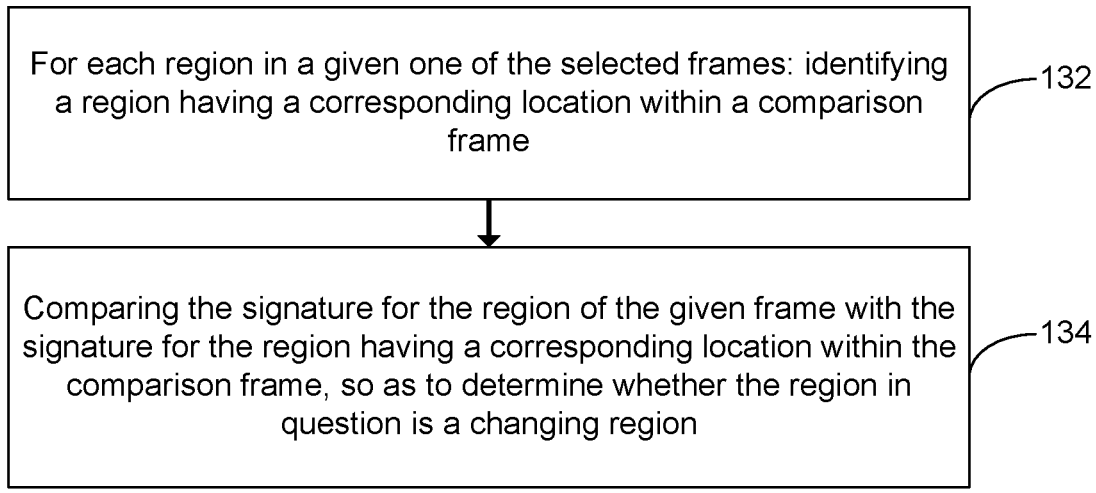
FIG. 2A is a flow diagram showing an example of a method for classifying regions in a given frame that may be implemented in embodiments of the disclosure.

Attention is now directed to FIG. 2A, which is a flow diagram showing an example of a method for classifying regions of a given frame, that may be implemented in embodiments of the disclosure, for example as part of step 130 in the method of FIG. 1. FIGS. 2A-2C depict an example of an embodiment in which the regions of a given frame are classified as changing or static regions based on a plurality of comparison signatures for the given frame, which have been generated by the same signature algorithm as the signatures for the regions of the given frame.

As shown, the method of FIG. 2A includes step 132, which is carried out for each region of the frame in which changing regions are to be identified. Specifically, step 132 involves, for each such region of a selected frame, identifying a region having a corresponding location within a comparison frame. This comparison frame may, for example, precede the given frame within the input video data stream 10; for instance, it may be the immediately preceding frame.

Figure 2B:
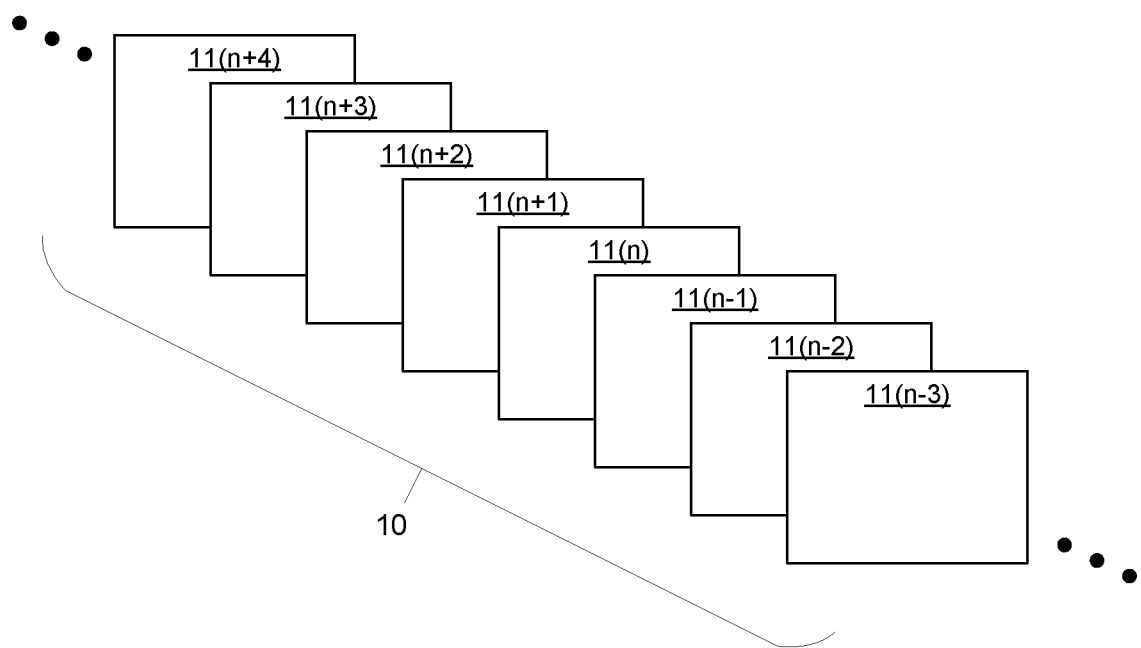
FIGS. 2B and 2C are schematic diagrams illustrating features of the method of FIG. 2A.
Figure 2C:
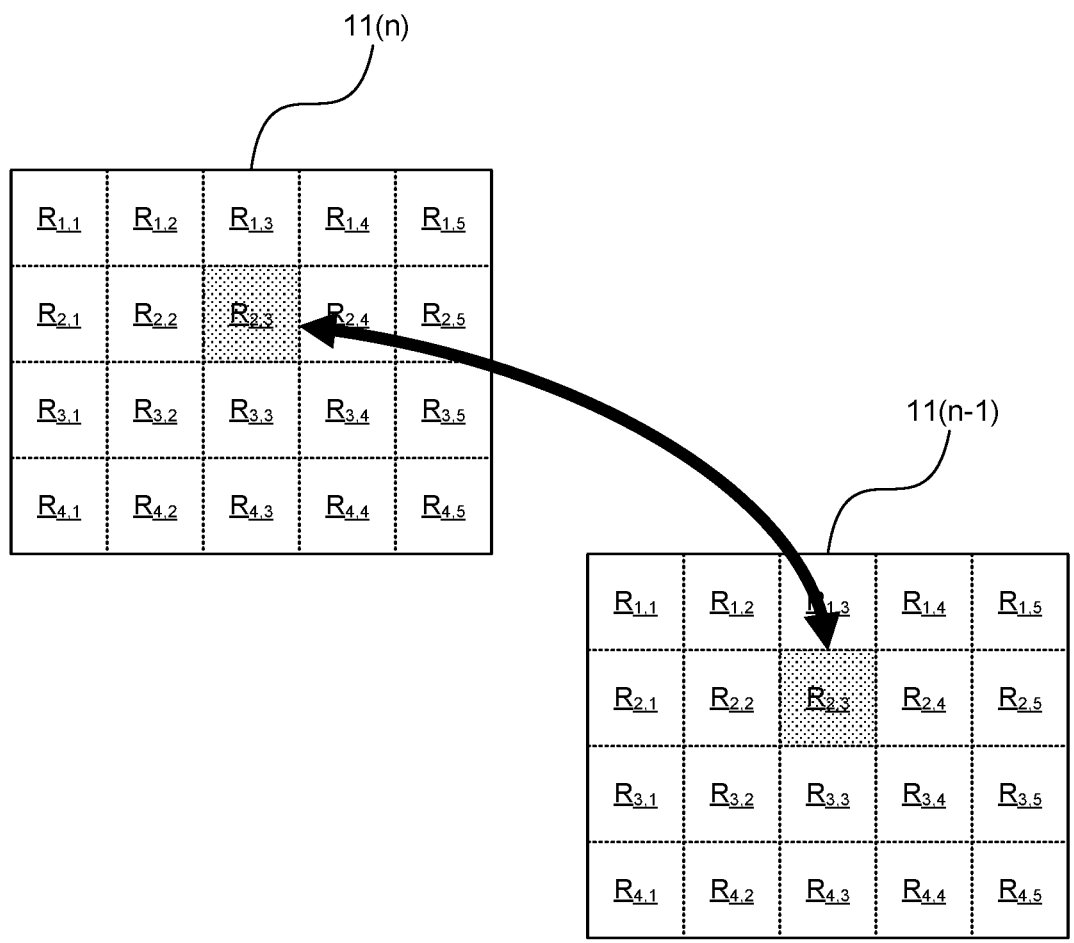

An example of such identification of a region with corresponding location is illustrated diagrammatically in FIGS. 2B and 2C. FIG. 2B shows an input video data stream 10 and a plurality of successive frames 11 represented therein. FIG. 2C shows a given frame 11(n) of the plurality of successive frames, and the corresponding subset 12(n) of selected frames, including comparison frame 11(n-1). In FIGS. 2B and 2C, individual frames are identified by suffixes (n-3)-(n+4); the frame being acted upon at the specific time instance shown in FIG. 2B is indicated with suffix (n), without implying any loss of generality.

As is apparent, in the particular example shown in FIGS. 2B and 2C, for a given frame 11(n) the corresponding comparison frame is the immediately preceding frame 11(n-1). This is however merely an example and in other embodiments the comparison frame could, for example be the frame two frames before the current frame 11(n-2), or three frames before the current frame 11(n-3), or any other suitable frame.

Also shown in FIG. 2C are the regions R for each frame, which are individually identified with row and column indices. FIG. 2C further illustrates how, for region $R_{2,3}$ of the given frame 11(n), region $R_{2,3}$ of frame 11(n-1) has been identified in step 132 as the region having corresponding location within the comparison frame 11(n-1).

Returning now to FIG. 2A, as shown, the method further includes step 134 of comparing the signature for the region from the given frame 11(n) with the signature for the region having a corresponding location within the comparison frame 11(n-1). In this way, the method determines, in step 134, whether the region of the given frame 11(n) is a changing region. For instance, in the particular case illustrated in FIG. 2C, the signature for region $R_{2,3}$ of frame 11(n) is compared with the signature for region $R_{2,3}$ of frame 11(n-1), and, based on this comparison, a determination is made as to whether region $R_{2,3}$ in frame 11(n) is a changing region.

Depending on, for example, the particular signature algorithm utilized and the requirements of the particular application, the comparison may, for instance, simply involve determining whether the signatures for the regions are identical: if they are, then the region in the given frame might be identified as a static region, and if they are not, then the region in the given frame might be identified as a changing region; alternatively, additional factors or data might be taken into account before classifying the region as a changing region or a static region.

In other, more complex examples, the comparison might involve determining whether the signatures for the regions have more than a threshold amount of similarity. This might, for example, involve determining a measure of distance between the signatures. For instance, where the signatures are (or can be represented as) strings, their similarity might be quantified by calculating the Hamming distance between them. If the amount of similarity is greater than the threshold value, then the region in the given frame might be identified as a static region; if it is lower than the threshold value, then the region in the given frame might be identified as a changing region; alternatively, additional factors or data might be taken into account before classifying the region as a changing region or a static region.

Using exact matching of signatures might, for example, be appropriate where the signature algorithm is relatively less sensitive to small changes in input data, whereas use of a similarity threshold might be appropriate with a more sensitive signature algorithm.

It should be noted that the classification of a particular region as a changing region or a static region may be based on additional factors to the above-described comparison of region signatures between the given frame and the comparison frame.

For example, the classification might additionally be based on a similar comparison of region signatures between the given frame and a further comparison frame (e.g. the frame two frames prior to the given frame, frame 11($n$-2) in FIG. 2B).

As a further example, several signatures might be determined, using respective signature algorithms, for each region in the given frame, and then be compared with corresponding signatures determined for the region with corresponding location in the comparison frame (or, as just noted, for respective regions in several comparison frames).

The several signature algorithms may act on, or be applied to, respective, distinct portions of the data representative of a region.

For instance, the signature algorithms might include a most significant portion signature and a least significant portion signature, generated from, respectively, a number, m, of the most and least significant bits of the data representing the region in the input video data stream (or a portion of it). For example, the most significant portion signature and the least significant portion signature might be generated from, respectively, m most and least significant bits of all of the color channels; for instance, in the case where m=4, the upper portion may be the top 4-bits of the red, green and blue color channels: red[7:4], green[7:4], blue[7:4]). Alternatively, the most significant portion signature and the least significant portion signature might be generated from, respectively, the m most and least significant bits of only one of the color channels, for example a luminance channel, such as the Y channel in a YUV color space.

It will of course be understood that the several signatures might include a middle portion signature, in addition to a most significant portion signature and/or a least significant portion signature.

As a further example of applying multiple signature algorithms to respective, distinct portions of the data representative of a region, a respective signature for each color channel might be used (e.g. one for each of RGB, or one for each of YUV).

As noted above, where several, i.e. n signatures are determined for each region, the classification of that region as either a changing region or a static region may include comparing each of the n signatures for that region with a corresponding one of the n signatures for the region having a corresponding location within the comparison frame. However, it should be appreciated that each of these signature comparisons need not be given equal weight when deciding whether to classify the region as changing or static.

For example, in the case where each signature acts on input data representative of a corresponding color channel in a YUV, or other color space with a luminance channel, the signature comparison in respect of the luminance channel might be given greater weight than the signature comparisons for the other channels. For instance, it could be weighted such that if only the Y channel signatures differ this is sufficient to classify the region as changing and, by contrast, such that if the Y channel signatures are the same, then both the U and V channel signatures must differ in order to classify the region as changing. This may in effect be viewed as a form of lossy compression, where a compression loss rate for each of the chrominance channels is greater than a compression loss rate for the luminance channel. Such a scheme may be appropriate since the human eye is more sensitive to brightness than color.

Where several signature algorithms act on, or are applied to, respective, distinct portions of the input data for a region of a given selected frame, the portion of the output video data stream corresponding to the given frame might be derived from only those portions of the data that the comparison of signatures indicates are changing.

To illustrate this, consider an example case where the set of signature algorithms includes a most significant portion signature and a least significant portion signature. In such a case, if, for some region of a given frame and the corresponding region of a comparison frame, only the least significant portion signatures differ by more than a threshold amount, then only the least significant portion of the input data for that region might be used in generating the output video data stream.

As a further example, consider a case where each signature algorithm acts on a respective color channel. In such a case, if the signature comparison indicates that only, for example, the R channel (e.g. in an RGB color space) is changing significantly for some region of a given frame, then only the portion of the input data representative of that color channel might be used in generating the output video data stream.

More generally, in such examples, the output data stream 20 may include a series of output frame data portions, each of which is derived from the changing data portions for the regions of a corresponding selected frame (and may, for example, be derived substantially solely from such changing data portions). Furthermore, in some such examples, generating the output data stream 20 might include discarding the remaining, static portions of data for the regions of the selected frame.

Still further, in some such examples each signature algorithm might be applied to a different, but related portion of data to that which is used in the generation of the output video data stream. Specifically, the signature algorithms may be applied to n respective, distinct test portions of the input data, whereas the output video data stream may be derived from n respective, distinct constitutive portions of the input data. Each test data portion is for example of smaller size than the associated constitutive data portion (e.g. so that the signature may be determined relatively easily). For instance, the test data portion may form part of the constitutive data portion.

To illustrate this, consider an example case where each test data portion is a most significant portion of the input data representative of a respective color channel (e.g. the most significant portion of the R channel in an RGB color space). In such a case, the corresponding constitutive data portion might the full portion of data representing the same color channel (the full portion of data representing the R channel). Such signatures based on test portions may be determined relatively quickly, but may also be effective in determining which constitutive portions of data are changing and should therefore be used in the generation of the output data stream.

Nonetheless, in more straightforward cases, each signature algorithm may be applied to the same portion of data as that which is used in the generation of the output video data stream, i.e. the test data portions may be the same as the constitutive data portions.

Returning now to FIG. 2C, as will be appreciated from the illustration, region $R_{2,3}$ of the comparison frame 11($n$−1) has a "corresponding location" to region $R_{2,3}$ of the given frame 11($n$) in that the regions have substantially the same relative locations within their respective frames. However, this is not limiting and in other embodiments, a region in a comparison frame might have a "corresponding location" that is determined based on imaging device motion data. Such motion data is for example representative of motion by the imaging device; for instance, it might be representative of translations and/or rotations of the imaging device.

As noted above, imaging device motion data may, for example, be generated by suitable motion sensors, such as accelerometers, gyro sensors, magnetometers, etc. Alternatively, imaging device motion data could be generated by analysis of portions of consecutive frames.

As an illustrative example, the corresponding location might be one which is offset from the equivalent relative location, with the offset being determined based on the motion data. This may be illustrated with reference to the example shown in FIG. 2C, where region $R_{2,3}$ of comparison frame 11($n$−1) has an equivalent relative location to region $R_{2,3}$ of the given frame 11($n$). Assuming, by way of example, that the imaging device that produced the input video data stream 10 is turning to the right, motion data indicating this rotation can be utilized by the method to provide a more effective region-by-region signature comparison. For instance, rather than comparing the signature of region $R_{2,3}$ of the given frame 11($n$) with that of region $R_{2,3}$ of comparison frame 11($n$−1), the method might instead perform a comparison with region $R_{2,2}$ of comparison frame 11($n$−1) (if the magnitude of the rotation indicated by the motion data is relatively small) or with $R_{2,1}$ of comparison frame 11($n$−1) (if the magnitude of the rotation is relatively large). This may be viewed as an example of a case in which the identification of changing and static regions is based not just on signatures, but also on imaging device motion data.

As is apparent from the discussion above, steps 132 and 134 are carried out for each region of the given frame 11($n$), so as to determine which regions of the given frame 11($n$) are changing regions. These steps may, for example, be carried out sequentially for the regions of the given frame 11($n$), i.e. in series, in some order; for instance, the steps might be carried out on the regions of the given frame 11($n$) in substantially the same order that data representing them appears within the input video data stream. Alternatively, steps 132 and 134 may be carried out in parallel for groups of, or all of, the regions of the given frame 11($n$).

As will be appreciated, where a method described above with reference to FIGS. 2A-2C is implemented as part of step 130 in the method of FIG. 1, the resulting classification of regions may be used in step 140 of the method of FIG. 1 when generating the stream of output video data.

Figure 3A:
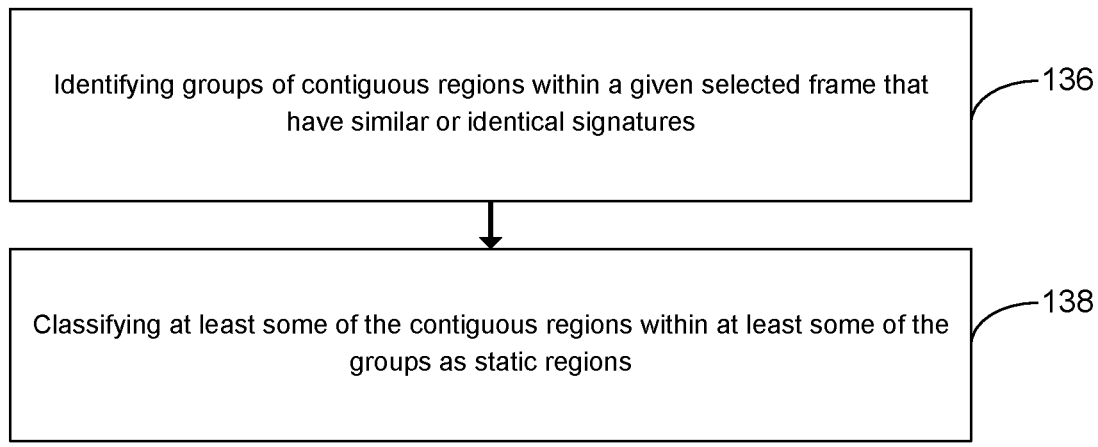
FIG. 3A is a flow diagram showing a further example of a method for classifying regions in a given frame that may be implemented in embodiments of the disclosure.
Figure 3B:
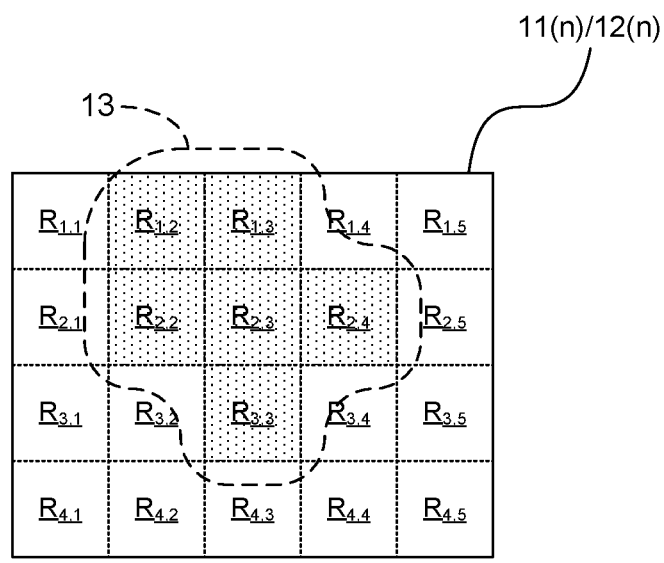
FIG. 3B is a schematic diagram illustrating features of the method of FIG. 3A.

Attention is now directed to FIGS. 3A and 3B, which illustrate a further example of a method for classifying regions in a given frame, that may be implemented in embodiments of this disclosure, for example as part of step 130 in the method of FIG. 1.

As is apparent from FIG. 3A, which is a flow diagram illustrating the steps of this method for identifying static regions in a given frame, the method includes a step 136 of identifying groups of contiguous regions within the given frame that have similar or identical signatures. It is considered that such groups of contiguous regions with similar or identical signatures tend to correspond to image features that typically do not change significantly over time, such as walls, or patches of sky or grass. Hence, it may be expected that regions within such a group will tend not to change significantly over time. Accordingly, such regions may be classified as static regions.

FIG. 3B shows a particular example of the method of FIG. 3A being applied to a given frame 11($n$), and displays the various regions R for the frame 11($n$); as before, the regions of the given frame 11($n$) are individually identified with row and column indices. As is apparent from FIG. 3B, in the particular example shown, the subset of selected frames 12($n$) corresponding to the given frame 11($n$) includes only the given frame 11($n$). The method may thus have a relatively small memory footprint, since signatures for other frames need not be stored.

As indicated by shading in FIG. 3B, the method has determined that contiguous regions $R_{1,2}$, $R_{1,3}$, $R_{2,2}$, $R_{2,3}$, $R_{2,4}$ and $R_{3,3}$ all have the same signatures, or all have similar signatures, depending on the particular implementation. For example, in some implementations the determination may involve identifying any groups of regions whose signatures are identical. A most significant portion signature might for example be utilized in such implementations, since it may identify contiguous regions having generally similar image content. Nonetheless, in other implementations, the method might involve identifying groups of regions whose signatures vary (e.g. in terms of some distance measure, as discussed above) by no more than a threshold amount; such a determination could, for instance, involve cluster analysis.

In some implementations, step 136 might only identify groups including more than a threshold number, N, of contiguous regions with the same or similar signatures. N may be given an appropriately large value for the particular implementation.

As shown by FIG. 3A, the method further includes step 138 of classifying at least some of the contiguous regions within at least some of the groups identified in step 136, as static regions. In some implementations, as part of step 138, all of the contiguous regions for all of the groups may be classified as static regions.

Alternatively, only certain of the contiguous regions for each group might be classified as static regions. For example, only regions that are spaced from the perimeter of a group might be classified as static (e.g. only region $R_{2,3}$ might be classified as static in the example shown in FIG. 3B); regions on the perimeter of a group may be relatively more likely to change with respect to time, for example as a result of movements of the imaging device.

As a further example, imaging device motion data could be used to determine which regions within such a group of contiguous regions with the same or similar signatures are likely to change with respect to time. For instance, if the motion data indicate the imaging device is rotating to the right, it may be expected that regions on the left and right sides of the group are likely to change over time and these may therefore be classified as changing regions, rather than static regions.

As noted above, imaging device motion data may, for example, be generated by suitable motion sensors, such as accelerometers, gyro sensors, magnetometers, etc. Alternatively, imaging device motion data could be generated by analysis of portions of consecutive frames.

As will be appreciated, where a method described above with reference to FIGS. 3A and 3B is implemented as part of step 130 in the method of FIG. 1, the classification of regions in step 138 as static regions may be used in step 140 of the method of FIG. 1 when generating the stream of output video data.

It should be noted that the classification methods described above with reference to FIGS. 2A-2C, and FIGS. 3A-3B may operate iteratively on each frame in the input video data stream 10; in other words, every frame may be a selected frame. However, this is by no means essential. For instance, in some embodiments, if several consecutive frames are determined to be mostly static (e.g. the total magnitude of changing regions in the frames is less than a threshold value), the method might pass over a number of the following frames before selecting another frame for processing. The number of frames to be skipped over might, for example, be determined in accordance with the number of mostly static frames. For example, if 10 frames had few or no changing regions, the method might skip the next 10 frames before processing another frame.

Figure 4A:
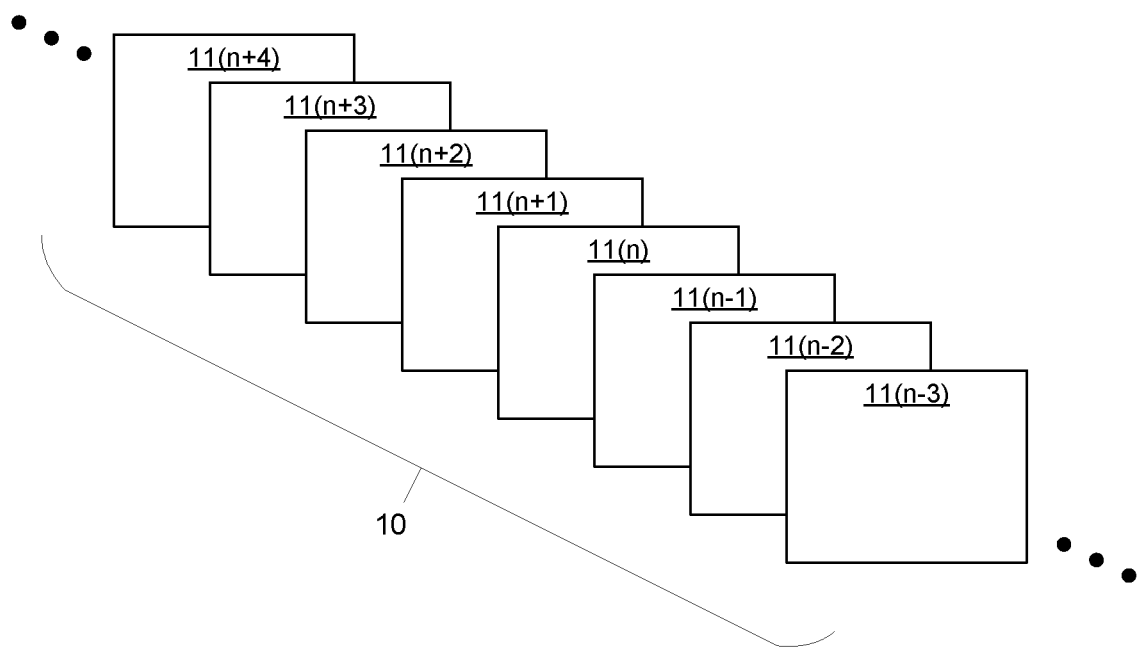
FIGS. 4A and 4B are schematic diagrams illustrating an example of a method for generating a stream of output video data based on an input video data stream.
Figure 4B:
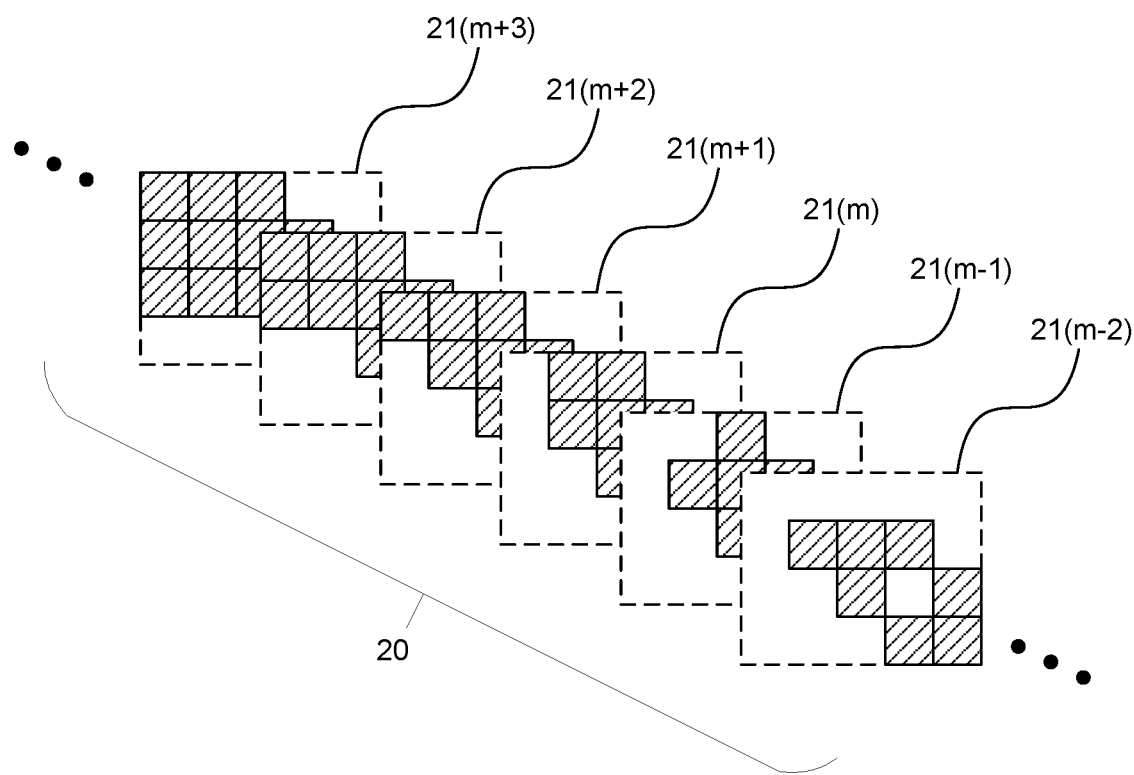

Attention is next directed to FIGS. 4A and 4B, which illustrate schematically an example of a method for generating a stream of output video data, based on an input video data stream. More particularly, FIG. 4A shows a stream of input video data 10, whereas FIG. 4B shows a stream of output video data 20 generated therefrom.

FIG. 4A shows the plurality of successive frames 11 represented in the input video data stream 10. As before, the frame being acted upon at the specific time instance shown in FIG. 4A is indicated with suffix 11(*n*), without implying any loss of generality.

The regions of the given frame 11(*n*) have been classified as changing or static regions based, at least in part, on the region signatures for the given frame. This classification may be carried out using any suitable method, such as those described above with reference to FIGS. 2A-2C or those described above with reference to FIGS. 3A-3B.

As shown schematically in FIG. 4B, the stream of output video data 20 comprises a series of output frame data portions 21 (with individual data portions being identified by suffixes (m−2)-(m+3)). Each such output frame data portion 21 is generated based on data within the input data stream 10 that represents any changing regions within the given frame 11(*n*). This is represented in FIG. 4B by the cross-hatching of only changing regions within the output frame data portions 21.

Furthermore, generating the output video data stream 20 may include discarding data within the input video data stream 10 that is representative of any static regions in the given frame 11(*n*). In some embodiments, the output video data stream 20 may be described as representing only the changing regions within the frames 11 of the input video data stream 10. This discarding of data representative of static regions may be considered a form of compression of the input video data stream 10.

In embodiments where data representative of the static regions is discarded, the output video data stream 20 may include data indicating such dropped static regions. This data may be used by other processes, for example processes downstream in an imaging pipeline. For instance, downstream processes may use such dropped region data to recall from memory (e.g. from a frame-buffer) data representative of a corresponding region of a previous frame. This may, in some cases, assist with the reconstruction of an input frame at a high fidelity level, and in some cases may allow exact reconstruction (e.g. where data in the output stream representative of the changing regions is not compressed).

Additionally, or alternatively, dropped region data may be used to assist with various downstream image processing operations, such as bayer processing, demosaicing and/or temporal noise filtering, and/or to assist with various computer vision processes, such as object detection.

For instance, with image processing operations, where the dropped region data indicate that a given region is a static region, data for a corresponding region of a previous frame (e.g. the immediately preceding frame) that has previously been processed (e.g. on which bayer processing, demosaicing and/or temporal noise filtering has been carried out) may be re-used. Thus, such image processing operations need not be carried out for the dropped region, conserving processing resources.

In a more specific example, dropped region data may, for example, be used to assist in a noise filtering operation. For instance, consider the case where noise filtering for a given frame is carried out by taking an average of the pixel levels for the given frame and for the two immediately preceding frames. In such a case, where the dropped region data indicate that a given region from one of these three frames is a static region, and thus substantially matches a region from the one of the other two frames, then an averaging operation need only be carried out based on pixel level data for the matching region and a corresponding region from the remaining frame (with appropriate weighting, e.g. double weighting, for the pixels from the matching region).

As another example concerning a computer vision operation (such as object detection), where the dropped region data indicate that a given region is a static region, the result from a corresponding region from a previous frame (e.g. the immediately preceding frame) may be re-used. For instance, where an object detection operation has determined that the corresponding region in the previous frame shows a cat (or part of a cat), then the given region may likewise be determined as showing a cat, given that it is a static region, and may therefore be expected to still show the same object.

In terms of format, each output frame data portion 21 may define, for a given changing region, pixel level data for a plurality of pixels making up the given changing region (potentially in a compressed format), as well as a location of the given changing region within the given frame 11(*n*). Generating an output video data stream 20 in such a format may be considered a lightweight form of compression of the input video data stream 10.

Figure 5A:
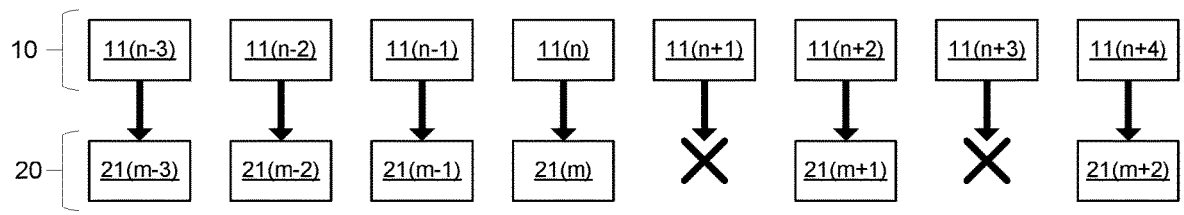
FIGS. 5A and 5B are schematic diagrams illustrating further examples of methods for generating a stream of output video data.
Figure 5B:
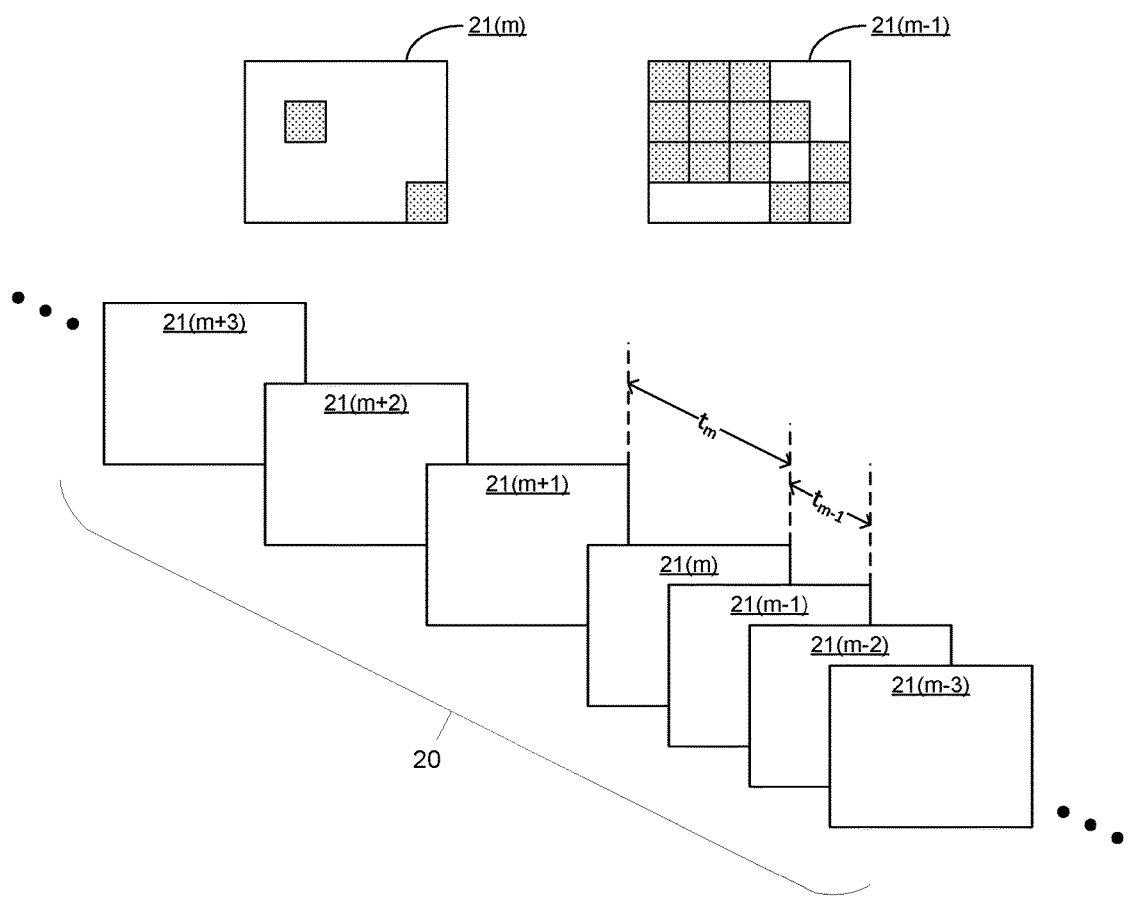

Attention is next directed to FIGS. 5A and 5B, which illustrate schematically further examples of methods for generating a stream of output video data, based on an input video data stream.

FIG. 5A shows a stream of input video data 10 and a plurality of successive frames 11 represented therein, and further shows a stream of output video data 20. As before, the frame being acted upon at the specific time instance shown in FIG. 5A is indicated with suffix 11(*n*), without implying any loss of generality.

As illustrated schematically in FIG. 5A, the output video data stream 20 is generated by determining whether a total magnitude of changing regions in the given frame 11(*n*) is less than a predetermined threshold, and, if so, discarding data within the input video data stream that represents the given selected frame 11(*n*). The output video data stream 20 may include data indicating any such dropped frames. This data may be used by other processes, for example processes downstream in an imaging pipeline. As a simple example, such data may avoid triggering error conditions when no output video data is received for a period of time. In other, more complex examples, such data may be used to assist with various downstream image processing operations, such as bayer processing, demosaicing and/or temporal noise filtering, and/or to assist with various computer vision processes, such as object detection.

For instance, with image processing operations, where the dropped frame data indicate that a given frame is a static frame, data for a previous frame (e.g. the immediately preceding frame) that has previously been processed (e.g. on which bayer processing, demosaicing, temporal noise filtering etc. has been carried out) may be re-used. Thus, such image processing operations need not be carried out for the dropped frame, conserving processing resources.

As another example concerning computer vision processes, where the dropped frame data indicates that a given frame is a static frame, the results for a previous frame (e.g. the immediately preceding frame) may be re-used. For instance, where an object detection operation has determined that portions of the previous frame show a cat, then corresponding portions of the given frame may likewise be determined as showing a cat, given that the given frame is a static frame, and may therefore be expected to still show the same object(s).

As shown in FIG. 5A, the output video data stream 20 may include a respective gap for each dropped frame, for example between portions of data representative of frames that were not dropped, such as output frame data portions 21($m$) and 21($m$+1), which correspond respectively to frames 11($n$) and 11($n$+2) of the input video data stream 10. Such a gap might, for example, correspond to a null data portion in the output video data stream 20.

FIG. 5B illustrates a related example, where the output video data stream includes a series of output frame data portions 21, each of which is representative of a corresponding selected frame 11. In the example of FIG. 5B, a time delay, t, between a given output frame data portion 21($m$) and an output frame data portion 21($m$+1) that is next in the series, is inversely related to a total magnitude of changing regions (for example, the total number of changing regions, or a weighted sum of changing regions, e.g. weighted by an amount of change in each region), and directly related to a total magnitude of static regions, of the corresponding selected frame 11($n$). For instance, as shown in FIG. 5B, output frame data portion 21($m$) corresponds to a frame with far more static regions than changing regions. As a result, the time delay tm until the next output data portion in the series 21($m$+1) is relatively long. By contrast, output frame data portion 21($m$−1) corresponds to a frame with far fewer static regions than changing regions. Thus, the time delay tm−1 until the next output data portion in the series 21($m$) is relatively short.

In some embodiments, there may be defined a maximum time delay between consecutive output frame data portions, which may, for example, correspond to a minimum update frequency for the output video data stream 20.

It should be appreciated that methods for generating a stream of output video data described above with reference to FIGS. 4A and 4B may be combined with methods described above with reference to FIGS. 5A and 5B.

For instance, in some embodiments, an output video data stream 20 might generated by determining whether a total magnitude of changing regions in a given frame 11($n$) is less than a predetermined threshold, and, if so, discarding data within the input video data stream that represents the given selected frame 11($n$), as is described with reference to FIG. 5A, Where the total magnitude of changing regions for a given frame 11($n$) (for example, the total number of changing regions, or a weighted sum of changing regions, e.g. weighted by an amount of change in each region) is greater than the predetermined threshold, a corresponding output frame data portion may be generated, based on data within the input video data stream 10 representative of the changing regions within the given frame 11($n$), as is described above with reference to FIGS. 4A and 4B. As also described above with reference to FIGS. 4A and 4B, generating the output video data stream 20 may involve discarding data within the input video data stream 10 that is representative of any static regions in the given frame 11($n$).

In such embodiments, the output video data stream 20 may include data indicating dropped regions, as described above with reference to FIGS. 4A and 4B, and/or dropped frames, as described above with reference to FIGS. 5A and 5B.

The methods described above with reference to FIGS. 1-5 may include further steps. In particular, such methods may include an initial step in which a compression mode is selected, for example based on user input. Suitable compression modes might for instance include a lossless mode (e.g., for autonomous driving or other applications where the quality of the output video data stream is of particular importance), and one or more lossless modes (e.g. for security camera or computer vision applications, where the quality of the output video data stream is typically of lesser importance), for example with respective different data loss rates that may be selected depending on the particular application (e.g. for a computer vision application, a mode with a relatively high compression loss rate might be selected, since computer vision processes tend to be relatively tolerant of noise).

Figure 6:
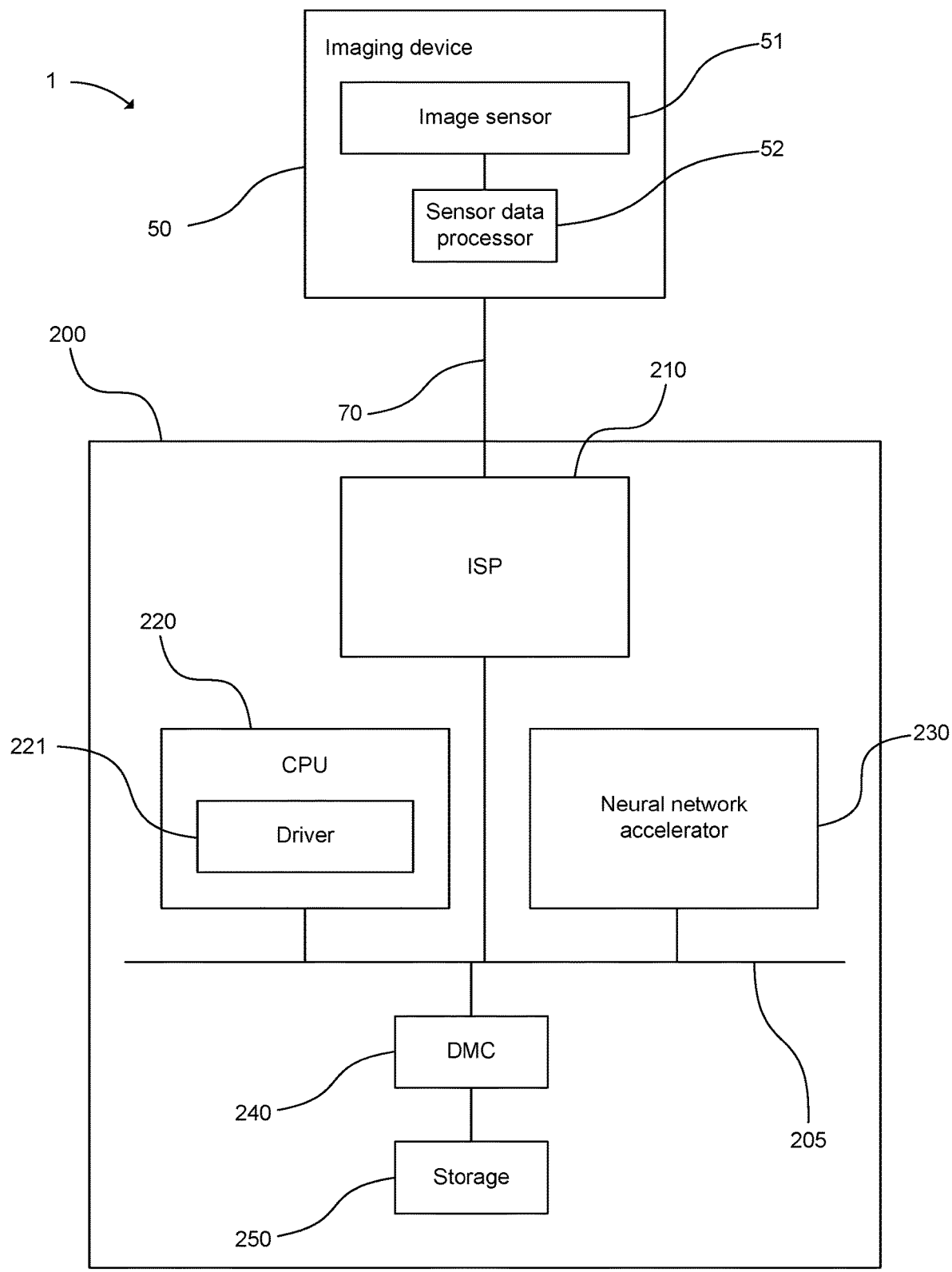
FIG. 6 is a schematic diagram illustrating internal components of a video processing system according to an embodiment of this disclosure.

Attention is next directed to FIG. 6, which shows schematically an example of a video processing system 1 for use with the methods described herein. The video processing system 1 of FIG. 6 may be coupled to, or form part of, a computer device, such as a personal computer, a laptop, a smartphone or an on-board computer device which may be coupled to or mounted within a vehicle such as a car.

As shown in FIG. 6, the video processing system 1 includes an imaging device 50, which in turn includes an image sensor 51 and a sensor data processor 52, and a computing system 200, which will be described in further detail below. As shown, the imaging device 50 and the computing system are in data communication by means of communication interface 70 (which is, for example, a camera serial interface CSI, or an adapted version thereof).

While FIG. 6 shows the image sensor 51 and sensor data processor 52 as separate boxes, it should be understood that these may be provided within the same component, such as a suitable integrated circuit. Furthermore, although the imaging device 50 is shown as including only one sensor data processor 52, it should be understood that, the sensor module 50 might include several sensor data processors. Furthermore, depending on the particular application, the imaging device may include various additional components. For example, where the imaging device 50 is configured as a camera, it may include one or more lenses.

An image sensor 51 typically includes an array of sensor pixels, which may be any suitable sensors for capturing images, such as photosensors. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 51 in this example is arranged to capture video data, which may be in the form of a series of images captured sequentially, with each image corresponding to a frame of the video.

The sensor data processor 52 may be configured (e.g. by suitable programming) to carry out the methods described above with reference to FIGS. 1-5B. In this way, redundant data may be removed at a relatively early stage, potentially resulting in the overall video processing system 1 operating in a computationally and/or energy efficient manner. For example, configuring the sensor data processor 52 to carry out the methods described above with reference to FIGS. 1-5B may reduce energy expended in transferring data from the imaging device 50 to the computing system 200. Transferring a stream of video data from the imaging device 50 to the computing system 200 may, in some cases, be energy intensive, especially with high frequency and/or high definition video.

Where it is intended that the sensor data processor 52 will carry out the methods described above, the processors within the computing system 200, such the CPU 220, may program the sensor data processor 52 to be suitable for carrying out such methods, for instance by updating the programming of the sensor data processor 52 so that it can output the output video data stream 20 over communication interface 70. For example, the sensor data processor 52 might be programmed with suitable data formats and/or communication protocols (e.g. an extended version of the Camera Serial Interface). In certain cases, the CPU 220 might suitably program the ISP 210, which in turn programs the sensor data processor 52 as described. Data may also be sent from the sensor data processor 52 to the ISP as part of the configuration process. With such approaches, a standard imaging device 50 may be configured by a suitably programmed CPU 220 to carry out the methods described herein.

In other examples, processors within the computing system 200, such as ISP 210 and/or CPU 220, may be configured (e.g. by suitable programming) to cooperate with the sensor data processor 52, such that they together carry out the methods described above with reference to FIGS. 1-5B. In still further examples, suitably programmed processors within the computing system 200, such as CPU 220, might carry out such methods without any significant involvement of the sensor data processor 52.

In FIG. 6, the image sensor module 50 is arranged to transfer video data to an image signal processor (ISP) 210 of a computing system 200 via communication interface 70. The ISP 210 may perform initial processing of video data to prepare the video for display. For example, the ISP 210 may perform demosaicing, saturation correction, renormalization and/or white balance adjustment, spatial and/or temporal filtering, although this is not to be taken as limiting.

The computing system 200 of FIG. 6 includes one or more processors. The one or more processors are for example configured to perform the methods described herein. In this example, the one or more processors of the computing system 200 include a central processor unit (CPU) 220, and a convolutional neural network (CNN) accelerator 230, which is a processor dedicated to implementing processing of data, including feature detection. In other examples, however, feature detection operations may be implemented using a more general processor, such as a GPU, or the CPU 220, in which case the CPU 220 might be the sole processor within the computer system 200.

In still other examples, the computing system 200 may include other or alternative processors such as a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system 200 may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

The CPU 220 of FIG. 6 includes a driver 221 which for example provides an interface between software configured to control or configure the CNN accelerator 230 and/or other components of the computing system 220. The driver 221 may therefore form part of or correspond to a control system for controlling the operation of the one or more processors.

The computing system 200 of FIG. 6 also includes a dynamic memory controller (DMC) 240 which may be used to control access to storage 250 of the computing system 200. The storage 250 is for example configured to store the video data received from the ISP 210.

The storage 250 is for example external to the neural network accelerator 230 and may be a random-access memory (RAM) such as DDR-SDRAM (double data rate synchronous dynamic random-access memory). In other examples, the storage 250 may be or include a non-volatile memory such as Read Only Memory (ROM) or a solid-state drive (SSD) such as Flash memory. The storage 250 in examples may include further storage devices, for example magnetic, optical or tape media, compact disc (CD), digital versatile disc (DVD) or other data storage media. The storage 250 may be removable or non-removable from the computing system 200. In examples, the CNN accelerator 230 may also include local storage including one or more buffers, which may nevertheless be considered to form part of the storage of the video processing system 200.

The components of the computing system 200 in the example of FIG. 6 are interconnected using a systems bus 205. This allows data to be transferred between the various components. The bus 205 may be or include any suitable interface or bus. For example, an ARM® Advanced Microcontroller Bus Architecture (AMBA®) interface, such as the Advanced eXtensible Interface (AXI), may be used.

It is to be appreciated that the video processing system 1 of FIG. 6 is merely an example and other video processing systems may be used in other examples.

The above examples are to be understood as illustrative examples. Further examples are envisaged.

Furthermore, it is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. Method for processing video data, comprising:
   receiving a stream of input video data representative of a plurality of successive frames, which have been generated by an image sensor of an imaging device;
   selecting at least some of said plurality of successive frames;
   for a given one of said selected frames:
   determining, using an image signature algorithm, a signature for each of a plurality of regions of the given selected frame; and based, at least in part, on the signatures for the regions of the given frame, classifying each region as either a changing region or a static region;

generating a stream of output video data that is a compressed version of said stream of input video data, in which an average data reduction rate for data representing the static regions of the selected frames is greater than an average data reduction rate for data representing the changing regions of said selected frames; and receiving imaging device motion data from a motion sensor, wherein said classifying of each region in the given frame as either a changing region or a static region is additionally based on a plurality of comparison signatures for the given frame, which comprise a respective signature for each of a plurality of regions of a comparison frame for the given frame, each comparison signature having been generated by said signature algorithm, wherein classifying each region in the given frame as either a changing region or a static region comprises, for each of the plurality of regions in the given frame:

identifying, within the comparison frame for the given frame, a region having a corresponding location, which is determined based on said imaging device motion data; and comparing the signature for the region of the given frame with the signature for the region having a corresponding location within each of the one or more comparison frames, so as to determine whether the region in question is a changing region, and wherein the signature algorithm is such that a signature of a given region has substantially smaller size than a portion of the input video data stream representative of said given region, and is characteristic of the given region, such that signatures for visually similar regions are the same or similar.

2. A method according to claim 1, wherein generating said stream of output video data comprises discarding data representing at least some of the static regions of the selected frames in said input video data stream.

3. A method according to claim 2, wherein said stream of output video data comprises data indicating the at least some of the static regions whose representative data in the input video data stream has been discarded.

4. A method according to claim 1, wherein generating said stream of output video data comprises, for a given selected frame:

determining whether a total magnitude of changing regions in the given frame is less than a predetermined threshold, and, if so, discarding data within said stream of input video data that represents the given selected frame, the given frame as a result being one of one or more dropped frames.

5. A method according to claim 4, wherein said stream of output video data comprises data indicating the one or more dropped frames.

6. A method according to claim 1, wherein said stream of output data comprises a series of output frame data portions, each of which is representative of a corresponding selected frame; and wherein a time delay, between a given output frame data portion and an output frame data portion that is next in said series, is inversely related to a total magnitude of changing regions, and directly related to a total magnitude of static regions, for the selected frame that corresponds to the given output frame data portion.

7. A method according to claim 1, wherein generating said stream of output video data comprises, for a given selected frame:

generating a series of output frame data portions, each of which is based on data within said input video data stream that is representative of any changing regions within the given selected frame; and discarding data within said input video data stream that is representative of one or more static regions in the given selected frame, said one or more static regions being, as a result, dropped regions;

wherein said output video data stream comprises said series of output frame data portions.

8. A method according to claim 7, wherein said stream of output video data comprises data indicating the dropped regions for the selected frames.

9. A video processing system comprising:

an imaging device, which comprises an image sensor;

at least one processor; and storage accessible by the at least one processor, having stored thereon instructions which, when executed by the at least one processor, cause the at least one processor to:

receive a stream of input video data representative of a plurality of successive frames, which have been generated by said image sensor;

select at least some of said plurality of successive frames;

for a given one of said selected frames:

determine, using an image signature algorithm, a signature for each of a plurality of regions of the given selected frame; and based, at least in part, on the signatures for the regions of the given frame, classify each region as either a changing region or a static region;

generate a stream of output video data that is a compressed version of said stream of input video data, in which an average data reduction rate for data representing the static regions of the selected frames is greater than an average data reduction rate for data representing the changing regions of said selected frames; and receiving imaging device motion data from a motion sensor, wherein said classifying of each region in the given frame as either a changing region or a static region is additionally based on a plurality of comparison signatures for the given frame, which comprise a respective signature for each of a plurality of regions of a comparison frame for the given frame, each comparison signature having been generated by said signature algorithm, wherein classifying each region in the given frame as either a changing region or a static region comprises, for each of the plurality of regions in the given frame:

identifying, within the comparison frame for the given frame, a region having a corresponding location, which is determined based on said imaging device motion data; and comparing the signature for the region of the given frame with the signature for the region having a corresponding location within each of the one or more comparison frames, so as to determine whether the region in question is a changing region, and wherein the signature algorithm is such that a signature of a given region has substantially smaller size than a portion of the input video data stream representative of said given region, and is characteristic of the given region, such that signatures for visually similar regions are the same or similar.

10. Method for processing video data, comprising:
receiving a stream of input video data representative of a plurality of successive frames, which have been generated by an image sensor of an imaging device;
selecting at least some of said plurality of successive frames;
for a given one of said selected frames:
  determining n signatures for each of a plurality of regions of the given selected frame, where n≥2, each of the n signatures being determined using a respective one of n signature algorithms; and
  based, at least in part, on the signatures for the regions of the given frame, classifying each region as either a changing region or a static region; and
generating a stream of output video data that is a compressed version of said stream of input video data, in which an average data reduction rate for data representing the static regions of the selected frames is greater than an average data reduction rate for data representing the changing regions of said selected frames,
wherein said classifying of each region in the given frame as either a changing region or a static region is additionally based on a plurality of comparison signatures for the given frame, which comprise n respective signatures for each of a plurality of regions of a comparison frame for the given frame, each comparison signature having been generated by a respective one of said n signature algorithms,
wherein classifying each region in the given frame as either a changing region or a static region comprises, for each of the plurality of regions in the given frame:
  identifying, within the comparison frame for the given frame, a region having a corresponding location; and
  comparing each of the n signatures for the region of the given frame with a corresponding one of the n signatures for the region having a corresponding location within the comparison frame, so as to determine whether the region in question is a changing region, and
wherein each signature algorithm is such that a signature of a given region has substantially smaller size than a portion of the input video data stream representative of said given region, and is characteristic of the given region, such that signatures produced by a given signature algorithm for visually similar regions are the same or similar.

11. A method according to claim 10, wherein each of said n signature algorithms acts on a respective one of n substantially distinct test portions of data representing the given region in said input video data stream;
  further comprising classifying each of n substantially distinct constitutive portions of data that represent the given region in said input video data stream, as either a changing data portion or a static data portion, each constitutive portion of data being associated with a respective one of said n test portions of data, including by, for each constitutive data portion for the given region of the given frame, comparing the signature of the associated test data portion with the signature of the corresponding test data portion for the region having a corresponding location within the comparison frame;
wherein said stream of output data comprises a series of output frame data portions, each output frame data portion being derived from any changing data portions for the regions of a corresponding one of said selected frames.

12. A method according to claim 10, wherein said n signature algorithms comprise a most significant portion signature and a least significant portion signature;
  wherein the most significant portion signature algorithm produces a most significant portion signature for a given region that is derived from p most significant bits of data representing the given region in said input video data stream, where p≥1; and
  the least significant bit signature algorithm produces a least significant bit signature for the given region that is derived from q least significant bits of data representing the given region in said input video data stream, where q≥1.

13. A method according to claim 10, wherein generating said stream of output video data comprises discarding data representing at least some of the static regions of the selected frames in said input video data stream.

14. A method according to claim 10, wherein said stream of output video data comprises data indicating the at least some of the static regions whose representative data in the input video data stream has been discarded.

15. A method according to claim 10, wherein generating said stream of output video data comprises, for a given selected frame:
  determining whether a total magnitude of changing regions in the given frame is less than a predetermined threshold, and, if so, discarding data within said stream of input video data that represents the given selected frame, the given frame as a result being one of one or more dropped frames.

16. A method according to claim 15, wherein said stream of output video data comprises data indicating the one or more dropped frames.

17. A method according to claim 10, wherein said stream of output data comprises a series of output frame data portions, each of which is representative of a corresponding selected frame; and
  wherein a time delay, between a given output frame data portion and an output frame data portion that is next in said series, is inversely related to a total magnitude of changing regions, and directly related to a total magnitude of static regions, for the selected frame that corresponds to the given output frame data portion.

18. A method according to claim 10, wherein generating said stream of output video data comprises, for a given selected frame:
  generating a series of output frame data portions, each of which is based on data within said input video data stream that is representative of any changing regions within the given selected frame; and
  discarding data within said input video data stream that is representative of one or more static regions in the given selected frame, said one or more static regions being, as a result, dropped regions;
  wherein said output video data stream comprises said series of output frame data portions.

19. A method according to claim 18, wherein said stream of output video data comprises data indicating the dropped regions for the selected frames.

20. A video processing system comprising:
an imaging device, which comprises an image sensor;
at least one processor; and storage accessible by the at least one processor, having stored thereon instructions which, when executed by the at least one processor, cause the at least one processor to:

receive a stream of input video data representative of a plurality of successive frames, which have been generated by said image sensor;

select at least some of said plurality of successive frames;

for a given one of said selected frames:
  determine n signatures for each of a plurality of regions of the given selected frame, where n≥2, each of the n signatures being determined using a respective one of n signature algorithms; and
  based, at least in part, on the signatures for the regions of the given frame, classify each region as either a changing region or a static region; and generate a stream of output video data that is a compressed version of said stream of input video data, in which an average data reduction rate for data representing the static regions of the selected frames is greater than an average data reduction rate for data representing the changing regions of said selected frames, wherein said classifying of each region in the given frame as either a changing region or a static region is additionally based on a plurality of comparison signatures for the given frame, which comprise n respective signatures for each of a plurality of regions of a comparison frame for the given frame, each comparison signature having been generated by a respective one of said n signature algorithms, wherein classifying each region in the given frame as either a changing region or a static region comprises, for each of the plurality of regions in the given frame:
  identifying, within the comparison frame for the given frame, a region having a corresponding location; and
  comparing each of the n signatures for the region of the given frame with a corresponding one of the n signatures for the region having a corresponding location within the comparison frame, so as to determine whether the region in question is a changing region, and wherein each signature algorithm is such that a signature of a given region has substantially smaller size than a portion of the input video data stream representative of said given region, and is characteristic of the given region, such that signatures produced by a given signature algorithm for visually similar regions are the same or similar.

* * * * *